United States Patent
Tomala et al.

(10) Patent No.: US 11,930,405 B2
(45) Date of Patent: Mar. 12, 2024

(54) METHODS AND APPARATUSES FOR PRIORITIZED RANDOM ACCESS DURING HANDOVER

(71) Applicant: Nokia Technologies Oy, Espoo (FI)

(72) Inventors: Malgorzata Tomala, Wroclaw (PL); Benoist Sebire, Tokyo (JP); Chunli Wu, Beijing (CN); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 16/965,707

(22) PCT Filed: Feb. 14, 2018

(86) PCT No.: PCT/CN2018/076832
§ 371 (c)(1),
(2) Date: Jul. 29, 2020

(87) PCT Pub. No.: WO2019/157706
PCT Pub. Date: Aug. 22, 2019

(65) Prior Publication Data
US 2021/0037434 A1 Feb. 4, 2021

(51) Int. Cl.
*H04W 4/00* (2018.01)
*H04W 36/00* (2009.01)

(52) U.S. Cl.
CPC ... *H04W 36/0055* (2013.01); *H04W 74/0833* (2013.01)

(58) Field of Classification Search
CPC ......... H04W 36/0055; H04W 74/0833; H04W 36/0077
(Continued)

(56) References Cited

U.S. PATENT DOCUMENTS

2007/0293224 A1* 12/2007 Wang ................ H04W 36/0011
455/436
2010/0272066 A1 10/2010 Wang et al.
(Continued)

FOREIGN PATENT DOCUMENTS

CA 2898564 A1 * 7/2014 ........ H04W 36/0055
CA 2908598 A1 * 10/2014 ........ H04W 36/0027
(Continued)

OTHER PUBLICATIONS

Office action received for corresponding Chinese Patent Application No. 201880089345.5, dated Dec. 21, 2021, 11 pages of office action and no page of translation available.
(Continued)

*Primary Examiner* — Thai D Hoang
(74) *Attorney, Agent, or Firm* — Nokia Technologies Oy (57) ABSTRACT

Systems, methods, apparatuses, and computer program products for prioritized random access during handover are provided. One method may include transmitting, by a source network node, a handover request to a target network node. The handover request may include an indication of a recognition of prioritized random access for a user equipment. The method may also include receiving an acknowledgement from the target network node, building a reconfiguration message, for the user equipment, comprising a prioritized set of random access parameters, and transmitting, to the user equipment, the reconfiguration message comprising the prioritized set of random access parameters.

20 Claims, 5 Drawing Sheets

(58) Field of Classification Search
USPC .......................... 370/331–334; 455/436–444
See application file for complete search history.

(56) References Cited

U.S. PATENT DOCUMENTS

| | | | |
|---|---|---|---|
| 2013/0343345 A1* | 12/2013 | Dinan | H04L 5/0007 370/332 |
| 2014/0087734 A1 | 3/2014 | Wang et al. | |
| 2014/0169336 A1* | 6/2014 | Oh | H04W 36/0055 370/332 |
| 2015/0181481 A1* | 6/2015 | Masini | H04W 36/0085 455/436 |
| 2017/0111933 A1 | 4/2017 | Wu | |
| 2017/0215119 A1* | 7/2017 | Hong | H04W 36/08 |
| 2018/0124650 A1* | 5/2018 | Park | H04W 36/0016 |
| 2018/0279186 A1* | 9/2018 | Park | H04W 36/0077 |
| 2018/0338271 A1* | 11/2018 | Park | H04W 36/08 |
| 2019/0223073 A1* | 7/2019 | Chen | H04W 36/0058 |
| 2020/0296635 A1* | 9/2020 | Rastegardoost | H04L 5/0048 |

FOREIGN PATENT DOCUMENTS

| | | | | |
|---|---|---|---|---|
| CN | 101785215 A | 7/2010 | | |
| CN | 102308626 A | 1/2012 | | |
| CN | 104185293 A | 12/2014 | | |
| CN | 104186010 A | 12/2014 | | |
| CN | 104782178 A | 7/2015 | | |
| CN | 105684491 A | 6/2016 | | |
| EP | 3277042 A1 | 1/2018 | | |
| WO | WO-2007149509 A2 * | 12/2007 | ............ | H04W 36/00 |
| WO | 2012/052052 A1 | 4/2012 | | |
| WO | 2015/135203 A1 | 9/2015 | | |
| WO | 2016/024900 A1 | 2/2016 | | |
| WO | 2017/196459 A1 | 11/2017 | | |
| WO | WO-2019157706 A1 * | 8/2019 | ........ | H04W 36/0055 |

OTHER PUBLICATIONS

Fan et al., "Vertical handoff research based on cognitive self-selection decision tree", Journal on Communications, vol. 34, No. 11, Nov. 2013, pp. 71-80.

Bin et al., "Prediction Vertical Handoff Algorithm in Vehicle Heterogeneous Network", Journal of Electronics & Information Technology, vol. 37, No. 4, Apr. 2015, pp. 874-880.

"LTE; Evolved Universal Terrestrial Radio Access (E-UTRA) and Evolved Universal Terrestrial Radio Access Network (E-UTRAN); Overall description; Stage 2 (3GPP TS 36.300 version 10.6.0 Release 10)", ETSI TS 136 300, V10.6.0, Jan. 2012, 209 pages.

"Report from LTE and NR User Plane Break-Out Session", 3GPP TSG-RAN WG2 NR Ad hoc 1801, R2-1801545, Agenda : 12.1.2, Session Chair (InterDigital), Jan. 22-26, 2018, pp. 1-43.

"CB 104—Summary of Prioritized Random Access", 3GPP TSG-RAN WG2 NR Ad hoc 1801, R2-1801560, Agenda : 10.3.1.4.1, Qualcomm, Jan. 22-26, 2018, 2 pages.

"Details of Prioritized Random Access for NR", 3GPP TSG-RAN WG2 Meeting NR Ad-Hoc #1, R2-1801430, Agenda : 10.3.1.4.1, AsusTek, Jan. 22-26, 2018, pp. 1-13.

"3rd Generation Partnership Project; Technical Specification Group Services and System Aspects; Service Requirements for the 5G system; Stage 1 (Release 16)", 3GPP TS 22.261, V16.2.0, Dec. 2017, pp. 1-53.

"3rd Generation Partnership Project; Technical Specification Group Access Network NR Radio Resource Control (RRC) Protocol Specification (Release 15)", 3GPP TS 38.331, V15.0.0, Dec. 2017, pp. 1-188.

"3rd Generation Partnership Project; Technical Specification Group Access Network; NR; Medium Access Control (MAC) Protocol Specification (Release 15)", 3GPP TS 38.321, V15.0.0, Dec. 2017, pp. 1-5.

International Search Report and Written Opinion received for corresponding Patent Cooperation Treaty Application No. PCT/CN2018/076832, dated Nov. 6, 2018, 11 pages.

Extended European Search Report received for corresponding European Patent Application No. 18906634.3, dated Sep. 22, 2021, 12 pages.

"3rd Generation Partnership Project; Technical Specification Group Radio Access Network; NR; NR and NG-RAN Overall Description; Stage 2 (Release 15)", 3GPP TS 38.300, V15.0.0 , Dec. 2017, pp. 1-68.

Office action received for corresponding Chinese Patent Application No. 201880089345.5, dated Jul. 22, 2022, 8 pages of office action and no page of translation available.

Office Action received for corresponding European Patent Application No. 18906634.3, dated Mar. 21, 2023, 10 pages.

Office Action received for corresponding Vietnamese Patent Application No. 1-2020-04292, dated Dec. 27, 2023, 2 pages of Office Action and 2 pages of translation available.

* cited by examiner

Fig. 1

RACH-ConfigDedicated information element

```
-- ASN1START
-- TAG-RACH-CONFIG-DEDICATED-START

RACH-ConfigDedicated ::=        SEQUENCE {
    CHOICE {
    -- Resources for handover to the cell
    ra-PriorityNeed         BOOLEAN,            OPTIONAL -Cond HO
    other RACH-CONFIG-DEDICATED IEs
    ...  }

-- TAG-RACH-CONFIG-DEDICATED-STOP
-- ASN1STOP
```

Fig. 2

```
RACH-PrioritzedConfig ::=    SEQUENCE {
    powerRampingStep         PowerRampingStep         OPTIONAL,
    backoffParameter         INTEGER (0)
}
```

METHODS AND APPARATUSES FOR PRIORITIZED RANDOM ACCESS DURING HANDOVER

RELATED APPLICATION

This application was originally filed as PCT Application No. PCT/CN2018/076832 on Feb. 14, 2018, each of which is incorporated herein by reference in its entirety.

FIELD

Some example embodiments may generally relate to mobile or wireless telecommunication systems. For instance, various example embodiments may relate to random access procedures in such telecommunication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

An embodiment is directed to a method that may include transmitting, by a source network node, a handover request to a target network node. The handover request may include an indication of a recognition of prioritized random access for a user equipment. The method may also include receiving an acknowledgement, from the target network node, building a reconfiguration message, for the user equipment, including a prioritized set of random access parameters, and transmitting, to the user equipment, the reconfiguration message comprising the prioritized set of random access parameters.

Another embodiment is directed to an apparatus that may include at least one processor and at least one memory comprising computer program code. The at least one memory and computer program code configured, with the at least one processor, to cause the apparatus at least to transmit a handover request to a target network node. The handover request may include an indication of a recognition of prioritized random access for a user equipment. The at least one memory and computer program code may be further configured, with the at least one processor, to cause the apparatus at least to receive an acknowledgement from the target network node, build a reconfiguration message, for the user equipment, including a prioritized set of random access parameters, and transmit, to the user equipment, the reconfiguration message comprising the prioritized set of random access parameters.

Another embodiment is directed to an apparatus that may include transmitting means for transmitting, by a source network node, a handover request to a target network node. The handover request may include an indication of a recognition of prioritized random access for a user equipment. The apparatus may also include receiving means for receiving an acknowledgement from the target network node, building means for building a reconfiguration message, for the user equipment, including a prioritized set of random access parameters, and transmitting means for transmitting, to the user equipment, the reconfiguration message comprising the prioritized set of random access parameters.

Another embodiment is directed to a non-transitory computer readable medium including program instructions stored thereon for performing the following: transmitting, by a source network node, a handover request to a target network node, where the handover request comprises an indication of a recognition of prioritized random access for a user equipment, receiving an acknowledgement, from the target network node, building a reconfiguration message, for the user equipment, with a prioritized set of random access parameters, and transmitting, to the user equipment, the reconfiguration message comprising the prioritized set of random access parameters.

Another embodiment is directed to a method that may include receiving, by a target network node, a handover request from a source network node. The handover request comprises an indication of a recognition of prioritized random access for a user equipment. The method may also include determining to prioritize the user equipment by providing high priority random access parameters, and transmitting a handover request acknowledgement to the source network node, wherein the handover request acknowledgement comprises an indication that the target node will configure the user equipment with the prioritized random access, or a prioritized set of random access parameters, or both.

Another embodiment is directed to an apparatus that may include at least one processor and at least one memory comprising computer program code. The at least one memory and computer program code configured, with the at least one processor, to cause the apparatus at least to receive a handover request including an indication of a recognition of prioritized random access for a user equipment, to determine to prioritize the user equipment by providing high priority random access parameters, and to transmit a handover request acknowledgement to the source network node. The handover request acknowledgement may include an indication that the apparatus will configure the user equipment with the prioritized random access, or a prioritized set of random access parameters, or both.

Another embodiment is directed to an apparatus including receiving means for receiving a handover request that includes an indication of a recognition of prioritized random access for a user equipment, determining means for determining to prioritize the user equipment by providing high priority random access parameters, and transmitting means for transmitting a handover request acknowledgement to the source network node. The handover request acknowledgement may include an indication that the target node will configure the user equipment with the prioritized random access, or a prioritized set of random access parameters, or both.

Another embodiment is directed to a non-transitory computer readable medium comprising program instructions stored thereon for performing the following: receiving, a handover request that includes an indication of a recognition of prioritized random access for a user equipment, determining to prioritize the user equipment by providing high priority random access parameters, and transmitting a handover request acknowledgement. The handover request acknowledgement may include an indication that the target node will configure the user equipment with the prioritized random access, or a prioritized set of random access parameters, or both.

Another embodiment is directed to a method that may include transmitting, by a user equipment, a measurement report to a source network node. The transmitting may include transmitting an indication that the user equipment is seeking prioritized random access. The method may also include receiving a reconfiguration including a prioritized random access configuration parameters set, and transmitting physical random access channel to a target network node providing the prioritized random access for the user equipment.

Another embodiment is directed to an apparatus that may include at least one processor and at least one memory comprising computer program code. The at least one memory and computer program code may be configured, with the at least one processor, to cause the apparatus at least to transmit a measurement report to a source network node, the measurement report may include an indication that the apparatus is seeking prioritized random access, to receive a reconfiguration comprising a prioritized random access configuration parameters set, and to transmit physical random access channel to a target network node providing the prioritized random access for the apparatus.

Another embodiment is directed to an apparatus that may include transmitting means for transmitting a measurement report to a source network node. The transmitting may include transmitting an indication that the apparatus is seeking prioritized random access. The apparatus may also include receiving means for receiving a reconfiguration including a prioritized random access configuration parameters set, and transmitting means for transmitting physical random access channel to a target network node providing the prioritized random access for the user equipment.

Another embodiment is directed to a non-transitory computer readable medium comprising program instructions stored thereon for performing the following: transmitting a measurement report to a source network node. The transmitting may include transmitting an indication that a user equipment is seeking prioritized random access. The program instructions may further perform: receiving a reconfiguration including a prioritized random access configuration parameters set, and transmitting physical random access channel to a target network node providing the prioritized random access for the user equipment.

BRIEF DESCRIPTION OF THE DRAWINGS

For proper understanding of the invention, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for prioritized random access during handover, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In mobile telecommunication systems, random access procedure is used to access the network, handover a UE to another cell, request uplink (UL) resources, etc. A UE or terminal accessing the system may transmit preamble sequence to obtain UL resources for transmission. The UE may transmit subsequent access request preambles with increasing transmitted power level to allow the network to detect the access request, as the initial message may not be recognized. The physical random access channel (PRACH) preamble, power ramping step and maximum transmission power configurations may be provided to the UE beforehand via broadcast. The process of increasing the transmitted power may continue until the network detects the access request. After detecting the request, the network may respond with random access response with UL resource allocation. If two UEs transmit their access requests at the same time, the two messages may collide. If a number of users attempt to initiate access at the same time, this may naturally increase congestion and will result in contention. To help in contention-based cases, the network can signal the UEs that they have to wait a certain time before they try to connect again. Therefore, a backoff parameter may be signalled by the eNB in the random access response.

Due to newly upcoming performance requirements with 5G or NR, the 3$^{rd}$ generation partnership project (3GPP) has added, for 5G, new requirements for random access procedure to increase overall efficiency, resolve collision problems and reduce failed Random Access attempts (see, e.g., R2-1801545 3GPP RAN2 AH #3 Report). These requirements include that handovers using contention-based access and beam failure recovery will apply prioritized random access channel (RACH) procedures. The set of parameters for prioritization include powerRampingStep and Backoff parameter. Accordingly, a solution is needed that fulfils the 3GPP requirements for random access procedure and also decreases collisions and access failures. Certain example embodiments provide mechanisms that satisfy at least these requirements.

According to certain embodiments, in order to facilitate a prioritized collision-based random access procedure, a UE capability may be associated with ultra-reliable random access (RA) parameter set and their maintenance by network configuration. In an example embodiment, assignment of the prioritized random access procedure may be determined based on a trigger pertaining to the use case when the UE buffer status needs to be transmitted during handover and accompanying special service with high rank characteristics.

To initiate the procedure during the handover (HO) preparation phase, in one embodiment, the source gNB may indicate the need for special treatment for a UE. For example, in certain embodiments, the source gNB may transmit, to the target gNB, an indication of special treatment for the UE over the Xn-application protocol (Xn-AP) by additional information. The target gNB may then decide whether to provide a higher priority RA parameter to the UE in the HO command issued to the UE. After the acknowledgment with the target gNB, the UE may receive prioritized parameters for RA procedure in the handover command.

Figure 1:
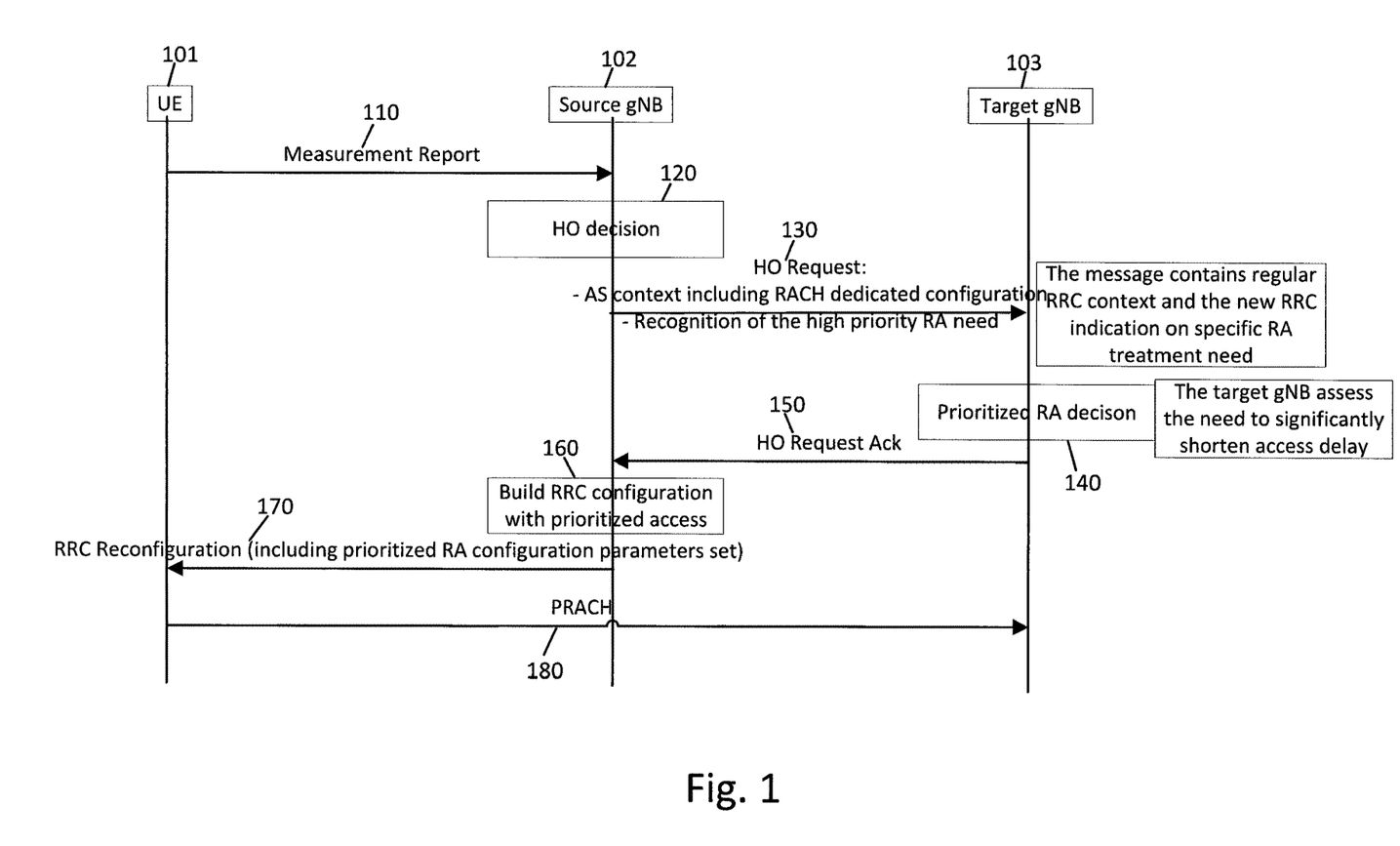
FIG. 1 illustrates an example signaling diagram, according to an embodiment.

FIG. 1 illustrates an example signaling diagram depicting a process for prioritized random access in HO, according to certain example embodiments. In the example of FIG. 1, the signaling may be performed between a UE 101, source gNB 102, and target gNB 103, according to some embodiments. According to the example of FIG. 1, to provide prioritized random access to the UE 101, the UE configuration from the source gNB 102 should be recognized as applicable for prioritized random access in the target gNB 103.

As illustrated in the example of FIG. 1, the UE 101 may transmit, at 110, its measurement report to the source gNB 102. At 120, the source gNB 102 may make a HO decision and, at 130, the source gNB 102 may transmit a HO request to the target gNB 103. In an embodiment, the HO request may include access stratum (AS) context including RACH dedicated configuration, along with recognition of the need for high priority RA. Thus, in certain embodiments, the HO request message 130 may include regular RRC context and a new RRC indication on the need for specific RA treatment.

In certain example embodiments, the recognition of the need to apply a more reliable or prioritized RA procedure may be based (e.g., in the target cell/target gNB) on PDU session, established QoS flows and corresponding QoS flow IDs (QFIs), the UE buffer status (as most recently reported by the UE for uplink and as known by the gNB for the downlink), special service (determined based on high rank flow or UE capabilities (e.g. URLLC), configurations and characteristic (e.g., Access Class 11-15), and/or dedicated UE capability, or any combination thereof. In some additional embodiments, the recognition of the need to apply a more reliable or prioritized RA procedure may be based (e.g., in the source cell/source gNB) on a separate explicit indication from the target gNB 103 to the source gNB 102 on prioritized treatment over Xn-application protocol (Xn-AP), and/or an indication along transferred UE AS-Context by means of extended RRC container content, or any combination thereof. In yet another embodiment, the recognition of the need to apply prioritized RA may be based on an explicit indication provided by the UE that it is seeking prioritized RA.

According to certain embodiments, HO request 130 may include an indication, during handover procedure to the target gNB 103, of the most recent buffer status of UE 101. For example, in one example, the buffer status may be a bitmap of the logical channel groups (LCGs) with data available for transmission, or the LCG ID of the LCG with highest priority logical channel (LCH) that has data buffered for transmission. In another example, the buffer status may be a bitmap of the logical channels or data radio bearers (DRBs) with data available for transmission, or alternatively indicated with LCH ID of the logical channel or DRB ID of the DRB. In another example, the buffer status may also be an indication of the high rank flows currently in the UE buffer without providing detailed buffer status. In yet another embodiment, the HO request may include one bit indicating whether the UE has high priority data buffered for transmission, without indicating the detailed actual data volume.

In example embodiments, with the buffer status information provided in the HO request 130, from the source gNB 102 to the target gNB 103, the target gNB 103 may decide, at 140, whether to prioritize the UE 101 by providing high priority RA parameters, e.g., to prioritize the UEs with high priority data buffered for transmission. In an embodiment, the decision whether to prioritize the UE 101 may include assessing the need to significantly shorten access delay.

Figure 2:
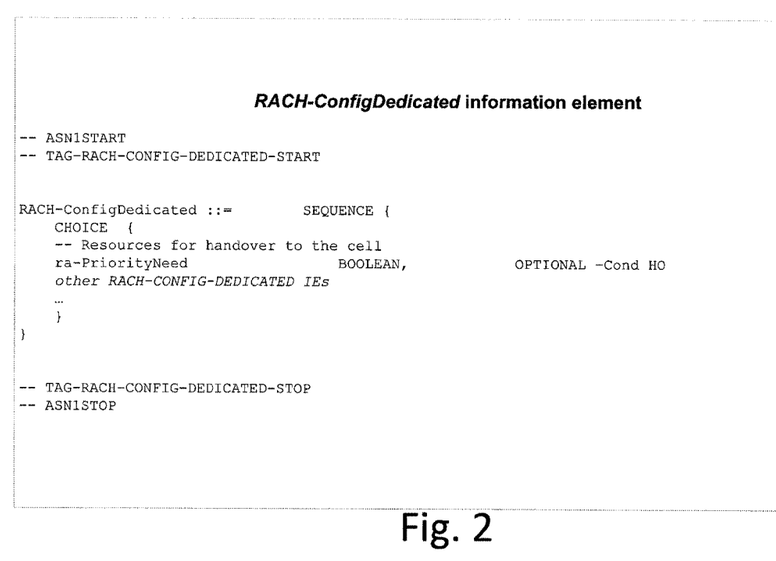
FIG. 2 illustrates an example information element, according to one embodiment.

According to an embodiment, based on its prioritized RA decision 140, the target gNB 103 may proceed to apply differentiated RA treatment for the UE 101. In one example, this may include the target gNB 103 transmitting, at 150, a HO request acknowledgement (ACK). In an embodiment, the target gNB 103 may acknowledge explicitly or implicitly, in the HO request ACK 150, that it can provide the UE 101 with a prioritized set of RA parameters via RRC signalling. For example, the prioritized set of RA parameters may include a parameter for power ramping step (e.g., powerRampingStep parameter) or/and a parameter for backoff (e.g., Backoff parameter), which may be provided in an information element, such as a rach-ConfigDedicated information element. As one example, these parameters may apply exceptional values, which are different than normally applied, and used only in cases where the special prioritized treatment is triggered. FIG. 2 illustrate an example of a rach-ConfigDedicated information element that may be used to specify the dedicated RA parameters.

Figure 3:
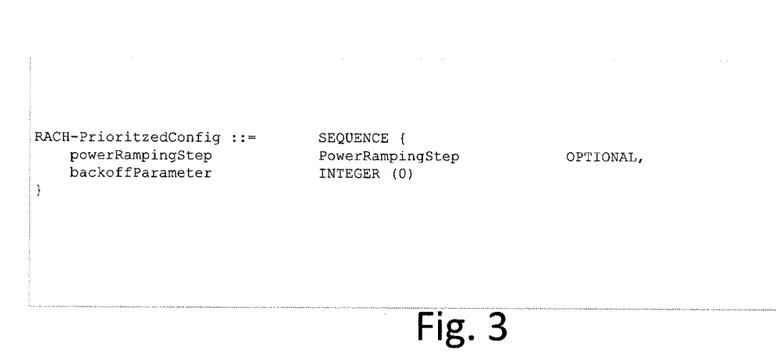
FIG. 3 illustrates an example information element, according to another embodiment.

According to certain embodiments, the prioritized set of RA parameters, i.e., the powerRampingStep parameter and Backoff parameter, may be provided in a rach-ConfigPrioritzed information element that applies for the recognized UEs. FIG. 3 illustrates an example of this rach-ConfigPrioritzed information element. It is noted that both the information elements of FIG. 2 and FIG. 3 may allow for a fixed powerRampingStep and a Backoff Parameter (e.g. backoff to be set equal to 0). It is noted that the HO field, which is illustrated in the example rach-ConfigDedicated information element of FIG. 2, is optionally present in the case of HO, once the target gNB 103 identifies the prioritized RA procedure is required, but otherwise this field is not present.

Alternatively or in addition, in some embodiments, the target gNB 103 may apply slice-aware admission control based on an exchanged Slice Support List parameter over Xn-AP and may link the recognized UE 101 with even further optimized configuration that allows reduced access processing timings and increased access success rate for the UE 101.

As further illustrated in the example of FIG. 1, after receiving the HO request ACK, the source gNB 102 may build, at 160, a RACH configuration (which may be different from that previously applicable in the source cell or/and maybe different from the RA parameters in system information for other UEs in the target cell) with prioritized set of RA parameters for the UE 101, for example, via RRC signalling. In an embodiment, at 170, the source gNB 102 may transmit, to UE 101, a RRC reconfiguration that may include the prioritized RA configuration parameters set. According to certain embodiments, after receiving the reconfiguration with the prioritized RA configuration parameters set, the UE 101 may transmit, at 180, the PRACH to the target gNB 103. After the handover procedure, the UE may read system information and acquire the RA parameters which are to be subsequently used for RA procedure for other purpose other than handover.

It should be noted that, while FIG. 1 illustrates signaling between nodes labeled as a gNB and UE, the gNB may also be an access point, base station, node B, eNB, or any other network node capable of providing radio access functionality, and the UE may be a mobile device, stationary device, IoT device, or any other device capable of communication with a wireless or wired communication network.

Figure 4A:
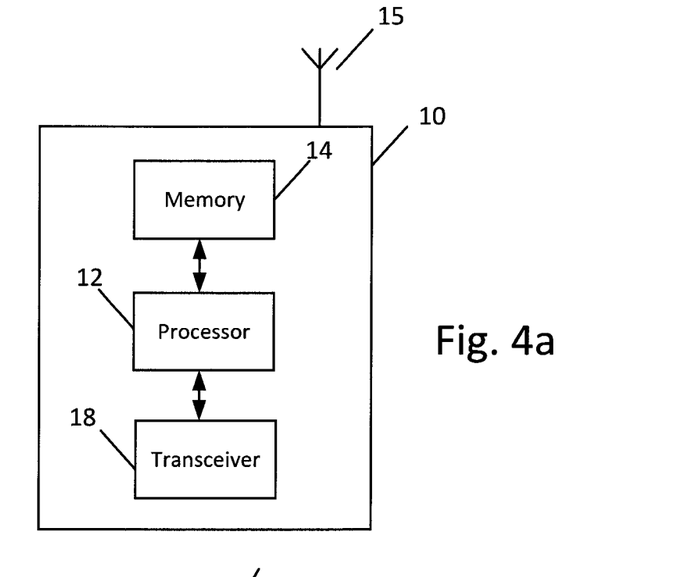
FIG. 4a illustrates an example block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagram illustrated in FIG. 1. For example, in certain embodiments, apparatus 10 may be controlled by memory 14 and processor 12 to perform one or more of the steps performed by the gNBs illustrated in FIG. 1. In certain embodiments, apparatus 10 may be configured to perform a procedure for prioritized random access during handover.

For instance, in one embodiment, apparatus 10 may correspond to the source gNB 102 illustrated in FIG. 1 and, therefore, may perform one or more of the steps undertaken by gNB 102 shown in FIG. 1 and discussed in detail above. More specifically, according to an embodiment, apparatus 10 may be controlled by memory 14 and processor 12 to transmit a HO request to a target network node (e.g., target cell or target gNB). In one example, the HO request may include an indication of a recognition that prioritized RA may be needed for a UE. According to one embodiment, apparatus 10 may also be controlled by memory 14 and processor 12 to receive an acknowledgement (e.g., HO request ACK), from the target network node. In one embodiment, the acknowledgement may indicate that the target node will configure the UE with the prioritized RA. In another embodiment, the acknowledgement may include a prioritized set of RA parameters. In an embodiment, apparatus 10 may then be controlled by memory 14 and processor 12 to construct or build a reconfiguration message (e.g., RACH configuration), for the UE, including a prioritized set of RA parameters, and to transmit, to the UE, the reconfiguration message including the prioritized set of random access parameters.

According to certain example embodiments, the recognition that the UE may need prioritized random access may be based on a protocol data unit (PDU) session, established quality of service (QoS) flows and corresponding QoS flow identifiers (QFIs), a buffer status of the user equipment, special service, configurations and characteristic, and/or dedicated user equipment capability. In some further embodiments, the recognition that the UE may need prioritized random access may be based on a separate explicit indication from the target network node to the apparatus 10 on prioritized treatment over Xn-AP, and/or an indication along transferred UE AS-context, for example, by means of an extended RRC container content. In some embodiments, the recognition that the UE may need prioritized random access may be based on a slice the UE is associated with.

In an embodiment, apparatus 10 may be controlled by memory 14 and processor 12 to transmit the HO request with an indication of a most recent buffer status of the UE. According to certain embodiments, the buffer status may include a bitmap of LCGs with data available for transmission, the LCG ID of the LCG with a highest priority logical channel that has data buffered for transmission, and/or an indication of high rank flows currently in the UE buffer without providing detailed buffer status. In one embodiment, apparatus 10 may be controlled by memory 14 and processor 12 to transmit the HO request with a one bit indication of whether the UE has high priority data buffered for transmission. According to some embodiments, the prioritized set of random access parameters may include a powerRampingStep parameter or/and Backoff parameter provided in a rach-ConfigDedicated information element. In some embodiments, a backoff factor may be used by the UEs to derive their individual backoff intervals based on a backoff indicator sent by gNB.

In another embodiment, apparatus 10 may correspond to the target gNB 103 illustrated in FIG. 1 and, therefore, may perform one or more of the steps undertaken by gNB 103 shown in FIG. 1 and discussed in detail above. For example, according to this embodiment, apparatus 10 may be controlled by memory 14 and processor 12 to receive a HO request, from a source network node, including an indication of a recognition that a UE may need prioritized RA. In an embodiment, apparatus 10 may also be controlled by memory 14 and processor 12 to determine to prioritize the UE by providing high priority RA parameters, and to transmit a HO request acknowledgement to the source network node. According to one example, the HO request acknowledgement may include an indication that the apparatus 10 will configure the UE with the prioritized RA. According to another example, the HO request acknowledgement may include a prioritized set of RA parameters.

According to certain embodiments, apparatus 10 may be controlled by memory 14 and processor 12 to receive the HO request including an indication of a most recent buffer status of the UE. As discussed above, in some embodiments, the buffer status may include a bitmap of LCGs with data available for transmission, the LCG ID of the LCG with a highest priority logical channel that has data buffered for transmission, and/or an indication of high rank flows currently in the UE buffer without providing detailed buffer status.

In one embodiment, apparatus 10 may be controlled by memory 14 and processor 12 to receive the HO request including a one bit indication of whether the UE has high priority data buffered for transmission. According to an embodiment, apparatus 10 may be controlled by memory 14 and processor 12 to apply slice-aware admission control based on an exchanged Slice Support List parameter over a Xn-AP and to link the user equipment with further optimized configuration that allows reduced access processing timings and increased access success rate for the user equipment.

Figure 4B:
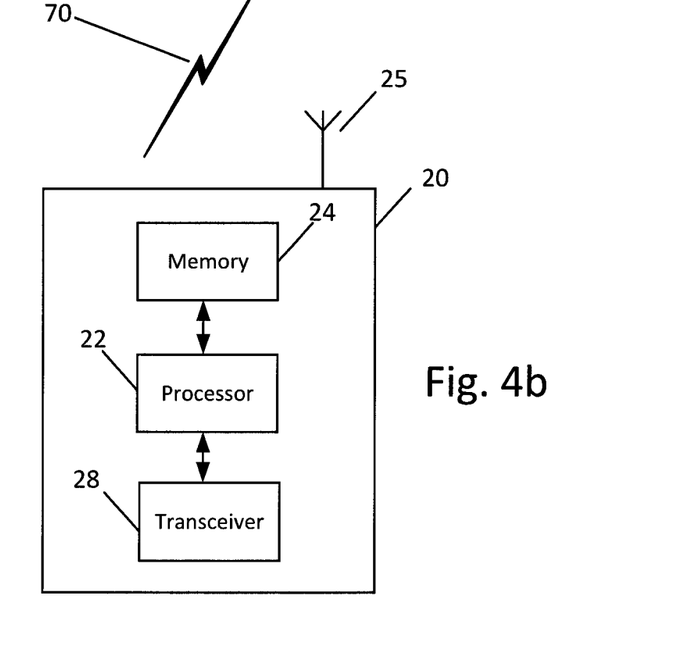
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein, such as the signaling diagram illustrated in FIG. 1.

According to some embodiments, apparatus 20 may be controlled by memory 24 and processor 22 to transmit its measurement report to a serving or source gNB. In one example, apparatus 20 may also be controlled by memory 24 and processor 22 to transmit, either with the measurement report or separately, an indication that apparatus 20 is seeking prioritized RA. In certain embodiments, apparatus 20 may be controlled by memory 24 and processor 22 to receive a RRC reconfiguration that may include a prioritized RA configuration parameters set. According to an embodiment, after receiving the reconfiguration with the prioritized RA configuration parameters set, apparatus 20 may be controlled by memory 24 and processor 22 to transmit the PRACH to a target gNB, which may provide prioritized RA for the apparatus 20.

Figure 5A:
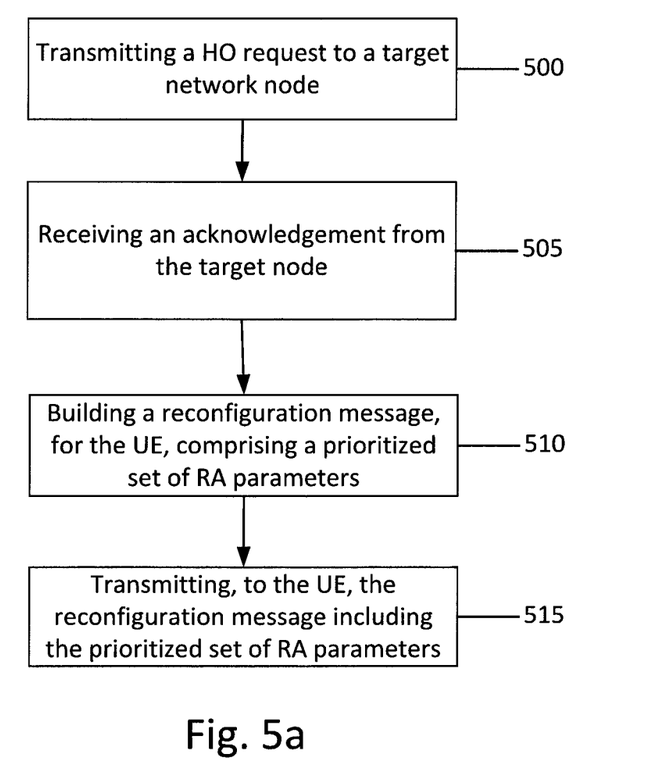
FIG. 5a illustrates an example flow diagram of a method, according to one embodiment.

FIG. 5a illustrates an example flow diagram of a method for prioritized RA during HO, according to one embodiment. In certain embodiments, the flow diagram of FIG. 5a may be performed by a network node, such as a base station, node B, eNB, gNB, or any other access node. More specifically, in one example embodiment, the method of FIG. 5a may be performed by a source network node, such as a source gNB. As illustrated in the example of FIG. 5a, the method may include, at 500, transmitting a HO request to a target network node. The transmitting 500 may include transmitting the HO request including an indication of a recognition of a need for prioritized RA for a UE.

In an embodiment, the recognition of the need for the prioritized RA may be based on a PDU session, established QoS flows and corresponding QFIs, a buffer status of the UE, special service, configurations and characteristic, and/or dedicated UE capability. According to a further embodiment, the recognition of the need for the prioritized RA may be based on an explicit indication received from the user equipment. In another embodiment, the recognition of the need for the prioritized RA may be based on a separate explicit indication from the target network node to the source network node on prioritized treatment over Xn-AP, and/or an indication along transferred UE AS-context, for example, by means of an extended RRC container content.

According to one embodiment, the transmitting 500 of the HO request may further include transmitting an indication of a most recent buffer status of the UE. The buffer status may include a bitmap of LCGs with data available for transmission, the LCG ID of the LCG with a highest priority logical channel that has data buffered for transmission, and/or an indication of high rank flows currently in the UE buffer without providing detailed buffer status. In another embodiment, the transmitting 500 of the handover request may include transmitting a one bit indication of whether the UE has high priority data buffered for transmission.

In certain embodiments, the method may also include, at 505, receiving an acknowledgement from the target network node. According to one example, the acknowledgement may indicate that the target node will configure the UE with the prioritized RA. According to another example, the acknowledgement may include a prioritized set of RA parameters. The method may then include, at 510, building a RRC reconfiguration message, for the UE, including the prioritized set of RA parameters. The method may also include, at 515, transmitting, to the UE, the RRC reconfiguration message including the prioritized set of RA parameters.

Figure 5B:
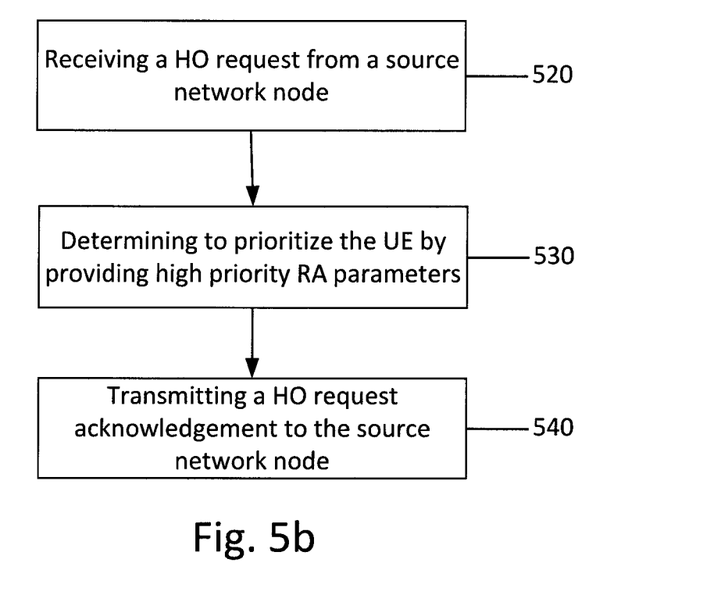
FIG. 5b illustrates an example flow diagram of a method, according to another embodiment.

FIG. 5b illustrates an example flow diagram of a method for prioritized RA during HO, according to one embodiment. In certain embodiments, the flow diagram of FIG. 5b may be performed by a network node, such as a base station, node B, eNB, gNB, or any other access node. More specifically, in one example embodiment, the method of FIG. 5b may be performed by a target network node, such as a target gNB. As illustrated in the example of FIG. 5b, the method may include, at 520, receiving a HO request from a source network node. The HO request may include an indication of a recognition that a UE may need prioritized RA. In an embodiment, the recognition of the need for the prioritized RA may be based on a PDU session, established QoS flows and corresponding QFIs, a buffer status of the UE, special service, configurations and characteristic, and/or dedicated UE capability. In some embodiments, the recognition may be performed either by the source network node or by the target network node. According to a further embodiment, the recognition of the need for the prioritized RA may be based on an explicit indication received from the user equipment.

According to one embodiment, the receiving 520 of the HO request may further include receiving an indication of a most recent buffer status of the UE. The buffer status may include a bitmap of LCGs with data available for transmission, the LCG ID of the LCG with a highest priority logical channel that has data buffered for transmission, and/or an indication of high rank flows currently in the UE buffer without providing detailed buffer status. In another embodiment, the receiving 520 of the handover request may include receiving a one bit indication of whether the UE has high priority data buffered for transmission.

The method may then include, at 530, determining to prioritize the UE by providing high priority RA parameters. The method may also include, at 540, transmitting a HO request acknowledgement to the source network node. According to an example, the HO request acknowledgement may include an indication that the target node will configure the UE with the prioritized random access. According to another example, the acknowledgement may include a prioritized set of RA parameters. In an embodiment, the method may also include applying slice-aware admission control based on an exchanged Slice Support List parameter over a Xn-AP and linking the user equipment with further optimized configuration that allows reduced access processing timings and increased access success rate for the UE.

Figure 5C:
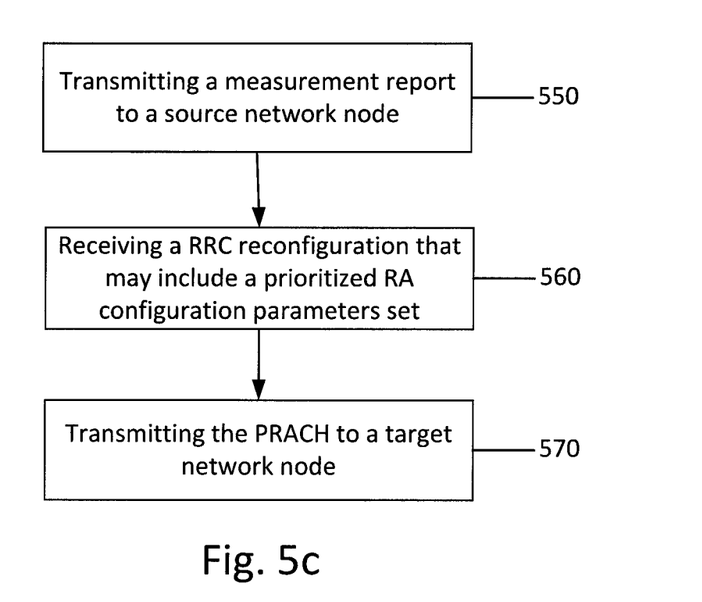
FIG. 5c illustrates an example flow diagram of a method, according to another embodiment.

FIG. 5c illustrates an example flow diagram of a method for prioritized RA during HO, according to one embodiment. In certain embodiments, the flow diagram of FIG. 5c may be performed, for example, by a UE, mobile station, mobile equipment, IoT device, or the like. As illustrated in the example of FIG. 5c, the method may include, at 550, transmitting a measurement report to a serving or source gNB. In one example, the method may also include the UE transmitting, either with the measurement report or separately, an indication that the UE is seeking prioritized RA. In certain embodiments, the method may also include, at 560, receiving a RRC reconfiguration that may include a prioritized RA configuration parameters set. According to an embodiment, after receiving the reconfiguration with the prioritized RA configuration parameters set, the method may then include, at 570, transmitting the PRACH to a target gNB, which may provide prioritized RA for the UE.

Therefore, certain example embodiments provide several technical improvements, enhancements, and/or advantages. Various example embodiments may provide prioritized random access during handover. For example, as a result of certain embodiments, collisions and access failures are reduced. As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

What is claimed is:

1. A method, comprising:
transmitting, by a source network node, a handover request to a target network node, wherein the handover request comprises an indication of a recognition of prioritized random access for a user equipment;
receiving an acknowledgement, from the target network node;
building a reconfiguration message, for the user equipment, comprising a prioritized set of random access parameters; and
transmitting, to the user equipment, the reconfiguration message comprising the prioritized set of random access parameters.

2. The method according to claim 1, wherein the recognition of the prioritized random access is based on at least one of: a protocol data unit session, established quality of service flows and corresponding QoS flow identifiers, a buffer status of the user equipment, special service, configurations and characteristic, dedicated user equipment capability, an explicit indication from the user equipment, a separate explicit indication from the target network node to the source network node on prioritized treatment over Xn-application protocol, or an indication along transferred user equipment access stratum context by means of an extended radio resource control container content.

3. The method according to claim 1, wherein the transmitting of the handover request further comprises transmitting an indication of a most recent buffer status of the user equipment, or a one bit indication of whether the user equipment has high priority data buffered for transmission.

4. The method according to claim 1, wherein the prioritized set of random access parameters comprises a parameter for power ramping step and/or a parameter for backoff provided in a configuration information element.

5. An apparatus, comprising:
at least one processor; and
at least one memory comprising computer program code,
the at least one memory and computer program code configured, with the at least one processor, to cause the apparatus at least to
transmit a handover request to a target network node, wherein the handover request comprises an indication of a recognition of prioritized random access for a user equipment;
receive an acknowledgement, from the target network node;
build a reconfiguration message, for the user equipment, comprising a prioritized set of random access parameters; and
transmit, to the user equipment, the reconfiguration message comprising the prioritized set of random access parameters.

6. The apparatus according to claim 5, wherein the recognition of the prioritized random access is based on at least one of: a protocol data unit session, established quality of service flows and corresponding QoS flow identifiers, a buffer status of the user equipment, special service, configurations and characteristic, dedicated user equipment capability, an explicit indication from the user equipment,
a separate explicit indication from the target network node to the apparatus on prioritized treatment over Xn-application protocol, or an indication along transferred user equipment access stratum context by means of an extended radio resource control container content.

7. The apparatus according to claim 5, wherein when transmitting the handover request, the at least one memory and computer program code are configured, with the at least one processor, to cause the apparatus at least to transmit an indication of a most recent buffer status of the user equipment, or to transmit a one bit indication of whether the user equipment has high priority data buffered for transmission.

8. The apparatus according to claim 7, wherein the buffer status comprises at least one of a bitmap of logical channel groups with data available for transmission, the logical channel group identifier of the logical channel group with a highest priority logical channel that has data buffered for transmission, or an indication of high rank flows currently in the user equipment buffer without providing detailed buffer status.

9. The apparatus according to claim 5, wherein the prioritized set of random access parameters comprises a parameter for power ramping step and/or a parameter for backoff provided in a configuration information element.

10. A method, comprising:
receiving, by a target network node, a handover request from a source network node, wherein the handover request comprises an indication of a recognition of prioritized random access for a user equipment;
determining to prioritize the user equipment by providing high priority random access parameters; and
transmitting a handover request acknowledgement to the source network node, wherein the handover request acknowledgement comprises an indication that the target network node will configure the user equipment with the prioritized random access, or a prioritized set of random access parameters, or both.

11. The method according to claim 10, wherein the recognition of the prioritized random access is based on at least one of: a protocol data unit session, established quality of service flows and corresponding QoS flow identifiers, a buffer status of the user equipment, special service, configurations and characteristic, or dedicated user equipment capability, or an explicit indication from the user equipment.

12. The method according to claim 10, wherein the receiving of the handover request further comprises receiving an indication of a most recent buffer status of the user equipment, or a one bit indication of whether the user equipment has high priority data buffered for transmission.

13. The method according to claim 10, wherein the prioritized set of random access parameters comprise a parameter for power ramping step and/or a parameter for backoff provided in a configuration information element.

14. An apparatus, comprising:
at least one processor; and
at least one memory comprising computer program code,
the at least one memory and computer program code configured, with the at least one processor, to cause the apparatus at least to
receive a handover request from a source network node, wherein the handover request comprises an indication of a recognition of prioritized random access for a user equipment;
determine to prioritize the user equipment by providing high priority random access parameters; and
transmit a handover request acknowledgement to the source network node, wherein the handover request acknowledgement comprises an indication that the apparatus will configure the user equipment with the prioritized random access, or a prioritized set of random access parameters, or both.

15. The apparatus according to claim 14, wherein the recognition of the prioritized random access is based on at least one of: a protocol data unit session, established quality of service flows and corresponding QoS flow identifiers, a buffer status of the user equipment, special service, configurations and characteristic, or dedicated user equipment capability, or an explicit indication from the user equipment.

16. The apparatus according to claim 14, wherein when receiving the handover request, the at least one memory and computer program code are configured, with the at least one processor, to cause the apparatus at least to receive an indication of a most recent buffer status of the user equipment, or to receive a one bit indication of whether the user equipment has high priority data buffered for transmission.

17. The apparatus according to claim 16, wherein the buffer status comprises at least one of a bitmap of logical channel groups with data available for transmission, the logical channel group identifier of the logical channel group with a highest priority logical channel that has data buffered for transmission, or an indication of high rank flows currently in the user equipment buffer without providing detailed buffer status.

18. The apparatus according to claim 14, wherein the prioritized set of random access parameters comprise a parameter for power ramping step and/or a parameter for backoff provided in a configuration information element.

19. The apparatus according to claim 14, wherein the at least one memory and computer program code are further configured, with the at least one processor, to cause the apparatus at least to apply slice-aware admission control based on an exchanged Slice Support List parameter over a Xn-application protocol and to link the user equipment with further optimized configuration that allows reduced access processing timings and increased access success rate for the user equipment.

20. An apparatus, comprising:
at least one processor; and
at least one memory comprising computer program code,
the at least one memory and computer program code configured, with the at least one processor, to cause the apparatus at least to
transmit a measurement report to a source network node, wherein the transmitting further comprises transmitting an indication that the apparatus is seeking prioritized random access;
receive a reconfiguration comprising a prioritized random access configuration parameters set; and
transmit physical random access channel to a target network node providing the prioritized random access for the apparatus.

* * * * *